(No Model.) 7 Sheets—Sheet 1.

T. BAUER & G. MENDHEIM.
COKE AND CARBONIZING OVEN.

No. 504,548. Patented Sept. 5, 1893.

Witnesses:
F. Fohr.
A. Faber du Faur

Inventors:
Theodor Bauer.
Georg Mendheim,
by A. Faber du Faur,
their Atty.

(No Model.)  7 Sheets—Sheet 3.

T. BAUER & G. MENDHEIM.
COKE AND CARBONIZING OVEN.

No. 504,548.  Patented Sept. 5, 1893.

Fig. 3

Witnesses:
F. Tohr.
A. Faber du Faur

Inventors:
Theodor Bauer
Georg Mendheim,
by A. Faber du Faur
their Att'y (No Model.) 7 Sheets—Sheet 4.

T. BAUER & G. MENDHEIM.
COKE AND CARBONIZING OVEN.

No. 504,548. Patented Sept. 5, 1893.

Witnesses:
F. Fohr
A. Faber du Faur

Inventors:
Theodor Bauer,
Georg Mendheim.
by A. Faber du Faur jr.
their Att'y (No Model.) 7 Sheets—Sheet 5.

T. BAUER & G. MENDHEIM.
COKE AND CARBONIZING OVEN.

No. 504,548. Patented Sept. 5, 1893.

Fig. 10.

Witnesses:
F. Fohr.
A. Faber du Faur

Inventors:
Theodor Bauer
Georg Mendheim.
by A. Faber du Faur
their att'ys (No Model.)

T. BAUER & G. MENDHEIM.
COKE AND CARBONIZING OVEN.

No. 504,548. Patented Sept. 5, 1893.

Witnesses:
F. Fohr
A. Faber du Faur

Inventors:
Theodor Bauer
Georg Mendheim,
by A. Faber du Faur,
their Atty.

(No Model.) 7 Sheets—Sheet 7.

T. BAUER & G. MENDHEIM.
COKE AND CARBONIZING OVEN.

No. 504,548. Patented Sept. 5, 1893.

Witnesses:
F. John.
A. Faber du Faur

Inventors:
Theodor Bauer.
Georg Mendheim.
by A. Faber du Faur
their Att'y.

UNITED STATES PATENT OFFICE.

THEODOR BAUER, OF BERLIN, AND GEORG MENDHEIM, OF MUNICH, GERMANY.

COKE AND CARBONIZING OVEN.

SPECIFICATION forming part of Letters Patent No. 504,548, dated September 5, 1893.

Application filed August 3, 1891. Serial No. 401,541. (No model.)

*To all whom it may concern:*

Be it known that we, THEODOR BAUER, a subject of the King of Bavaria, residing at Berlin, Prussia, and GEORG MENDHEIM, a subject of the King of Prussia, residing at Munich, Bavaria, Germany, have invented new and useful Improvements in Coke and Carbonizing Ovens, of which the following is a specification.

Our invention consists in coke and carbonizing ovens provided with counter-current air heating devices, in which the flame or the hot products of combustion after having served to heat the walls of the oven, give off an essential portion of their heat to the atmospheric air, serving to burn the gases conducted directly or indirectly from the coke oven into the flues of the latter and produced by dry distillation. The preparatory heating in the counter-current air heating devices is very energetic and as the latter are quite separated from the coking chambers the air arriving in a highly heated condition does not absorb from the said chambers an essential quantity of heat. The air for combustion being heated to a high degree causes a very complete combustion of the gases serving to heat the ovens, owing to which circumstance we obtain with a less quantity or with an inferior quality of heating gases, the same caloric effect as with larger quantities of gases or with gases of superior quality which are burned with cold air, or with air heated less in advance; or in using the same quantities and qualities of combustible gases we obtain a higher caloric effect than by a combustion with cold air. The air of combustion has been heated before, but it has been effected by other means; partly by employing regenerators with alternating currents (Siemens' system) for heating the secondary air for combustion, partly by heating the latter to a low degree only. In utilizing the heat of the flame escaping from the coke-oven, use was only made of the waste heat from thicker parts of the masonry of the oven, which has but little effect in the preparatory heating of the air; or the heat was taken from the flues at such places where it could be transmitted directly to the charge of the oven. The disadvantages resulting from such arrangements are avoided and a very high preparatory heating of the air is obtained by good counter-current air heaters, which in comparison with the alternating current regenerator (Siemens' system) offer the advantage that the first cost of the plant is lower and that the apparatus is easily attended to,—the output remaining the same. Moreover they can more easily be adapted to the different constructions of ovens and the heat is transmitted to the oven shaft in a more uniform manner.

We will now proceed to describe the horizontal ovens, reference being had to the accompanying drawings. The drying and heating of the ovens is effected as usual and in describing the construction and operation of the latter we assume that the oven has already been heated and is operated by the direct gases of the coke oven without extracting by-products. For charging the chambers A* A* the coal is discharged from the cars into the trough $b$ whence it passes through the apertures $a\ a\ a$ into the chambers, where the coal is pressed down by means of suitable tools through the openings $a\ a\ a$ arranged close to each other, whereby the very troublesome manipulations ordinarily employed in such ovens for completely filling the latter are dispensed with. The products of dry distillation escape through the apertures c c c arranged at the two ends of the oven into the channels $d'$ or $d^2$ respectively, and pass through the apertures $e\ e$ into the channels $f'$ $f^2$, where they meet highly heated air from the tubes $g\ g\ g$ and produce flame, the development and temperature of which can always be observed through suitable spy holes. Through the flues $i\ i\ i$ and the apertures $k\ k\ k$ the flame passes into the channels $l'$ and $l^2$ underneath the sole of the chamber, and from thence through the apertures $m\ m$ into the flues $n\ n$ and upward into the channel $o'$ and $o^2$ and flows then downwardly through the flues $p\ p$, and through $q\ q$ into the channel $r'$ or $r^2$ respectively, the sole of which is formed by the air heaters $B'$ and $B^2$ respectively. Passing through the vertical pipes $s\ s$ of the latter the escaping flame imparts to them continuously a portion of the heat remaining after the flame has passed through the flues $i\ n\ p\ q\ l'\ l^2$ serving to heat the overcharge. The flame then enters the channel $t$ and from thence through the apertures $u$ into the channel C leading to the chimney. In the aperture $u$ the draft of each chamber can be regulated at will by means of the corresponding register or slide $v$ which is accessible from the corridor D. If desired the fire gases may flow through the channel C first to a boiler or to the hearth of a drying kiln before they pass into the chimney. The air necessary for the combustion of the gases of the coke oven enters the lower part of the air chamber partly through the passages $w'\ w'$ and partly through the passages $w^2\ w^2$, to flow through the horizontal pipes $x\ x$ of the latter, which are underneath the plates $y$, and subsequently through the horizontal pipes of the air heater arranged underneath the plates $y^2\ y^3$ and $y^4$ and arrives finally through the pipes arranged above the plate $y^4$ into the small collecting channel $z$ and from the latter into the tubes $g$ which are made of peculiarly shaped bricks and lead upward between the walls of the oven and the flues of the same to the place of ignition. The peculiar shaped bricks which are perforated in two directions and from which the columns of the air heater are constructed, are illustrated on a larger scale in Figs. 6, 7, 8 and 9. The number of these bricks placed one above the other to form the column of the air heater, and the number of times the air to be heated is caused to flow through the column by means of the horizontal tubes arranged therein is dependent on the degree of heat to be given to the air of combustion. It may happen, that the air in lieu of passing six times as illustrated in the drawings, flows but four times, or but twice through the column, and on the other hand it may be advisable to cause the air to pass eight times or even still oftener. At all events the temperature of the air in the air heater B must be so high that this air in passing through the pipes $g\ g$ does not take off any heat from the walls of the oven or at least only a very small part of the same.

Figure 2:
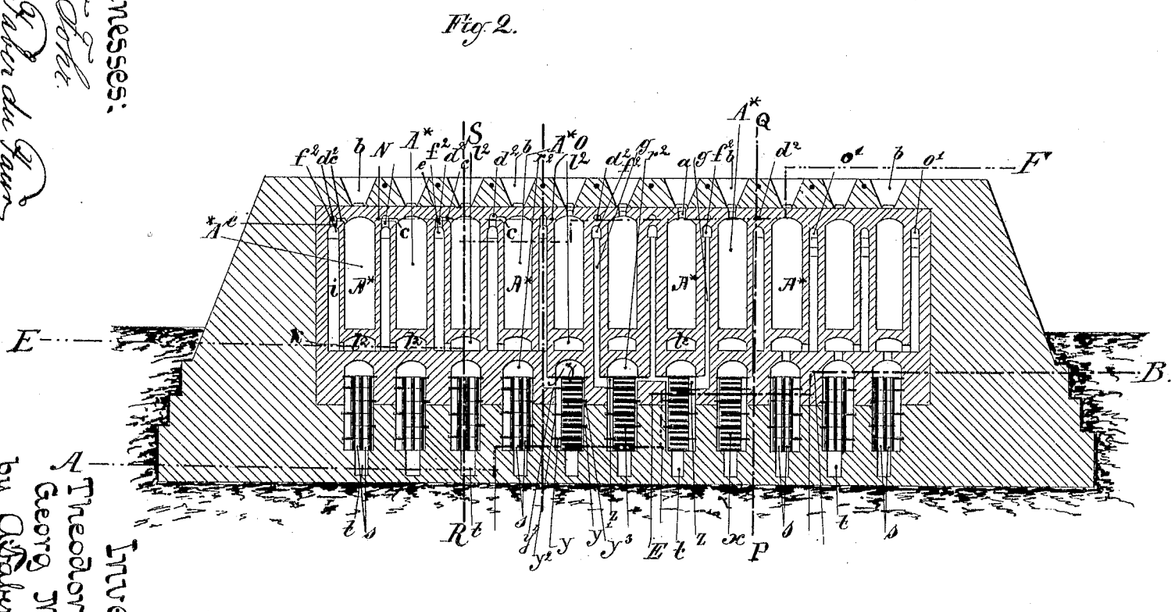
Fig. 2 is a vertical section on the line C D, Fig. 1.
Figure 3:
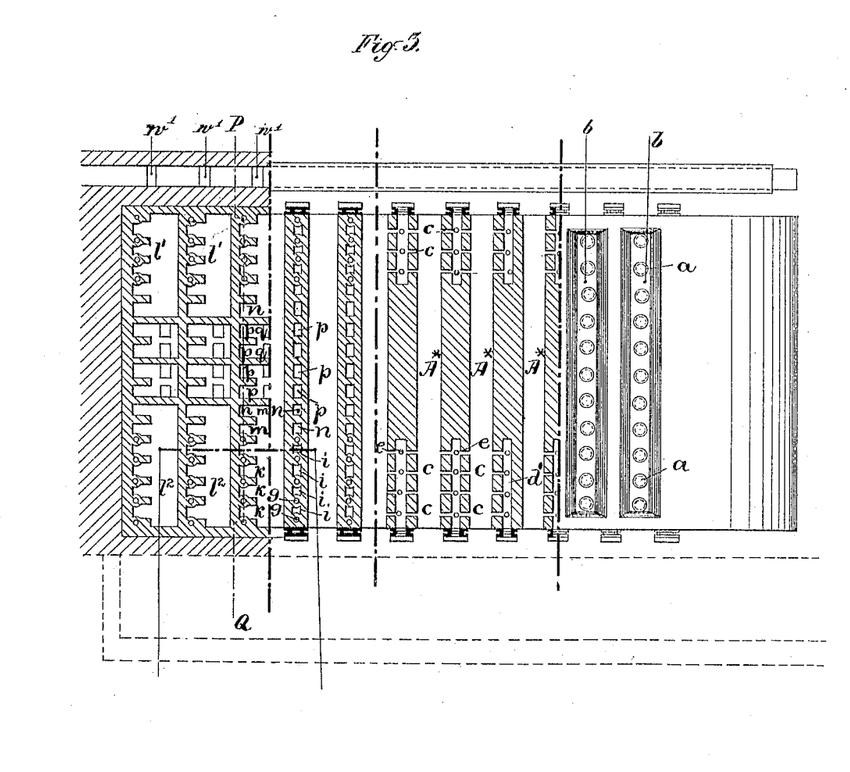
Fig. 3 is a horizontal section on the line E F, Fig. 2.
Figure 4:
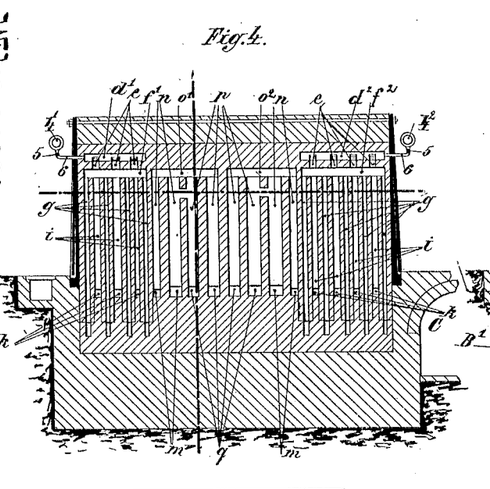
Fig. 4 is a section on line P Q, Fig. 2.
Figure 5:
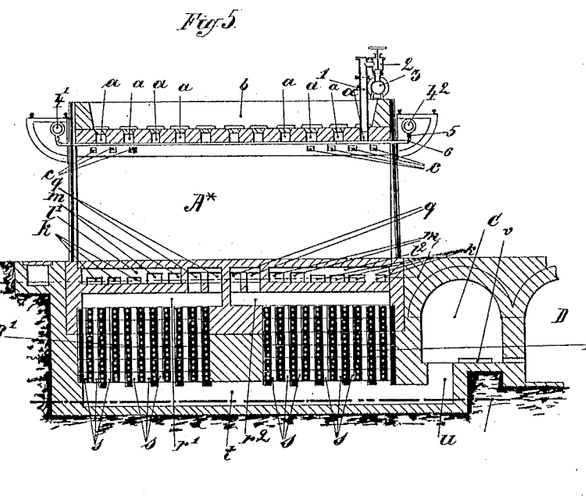
Fig. 5 is a section on line R S, Fig. 2.
Figure 6:
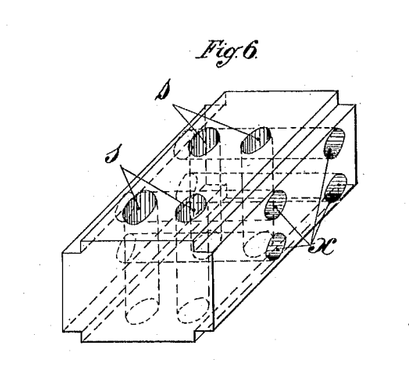
Fig. 6 is a perspective view of the brick from which the counter-current air heater is constructed.
Figures 7, 8, 9:
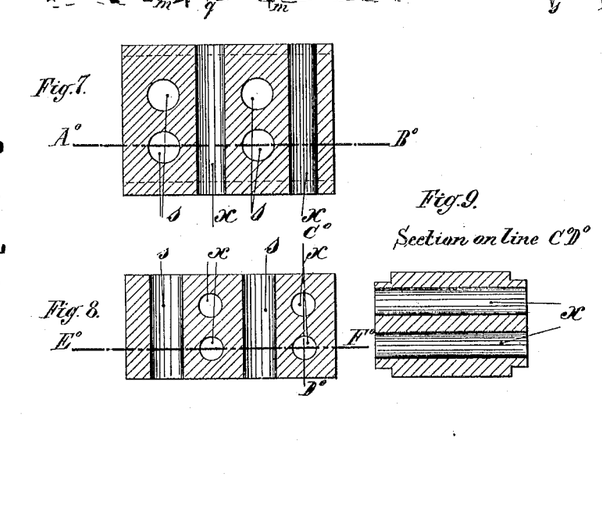
Fig. 7 is a section through the brick on line E° F°, Fig. 8.
Fig. 8 is a section through the brick on line A° B°, Fig. 7.
Fig. 9 is a section through the brick on line C° D°, Fig. 8.

From Fig. 2 of the drawings it is seen that the chambers on the left hand permit the escape of the combustible gases produced therein into the flues on the right hand, that likewise in the first chambers the air heated in the corresponding air heater arranged underneath the same is led to the left hand, and in the last chambers to the right hand, but that from two chambers located about in the central part of the plant, the gases produced therein as well as the air heated in the air heaters underneath the said chambers is conducted on both sides into the flues to the right hand as well as to the left hand, one of which therefore receives simultaneously the gas from two chambers and the air from two air heaters. These central chambers are of course a little less effective than the adjacent chambers, but this is less important than it would be if the said chambers were located directly at the ends of the series where they would be most exposed to loss of heat by radiation.

Figure 1:
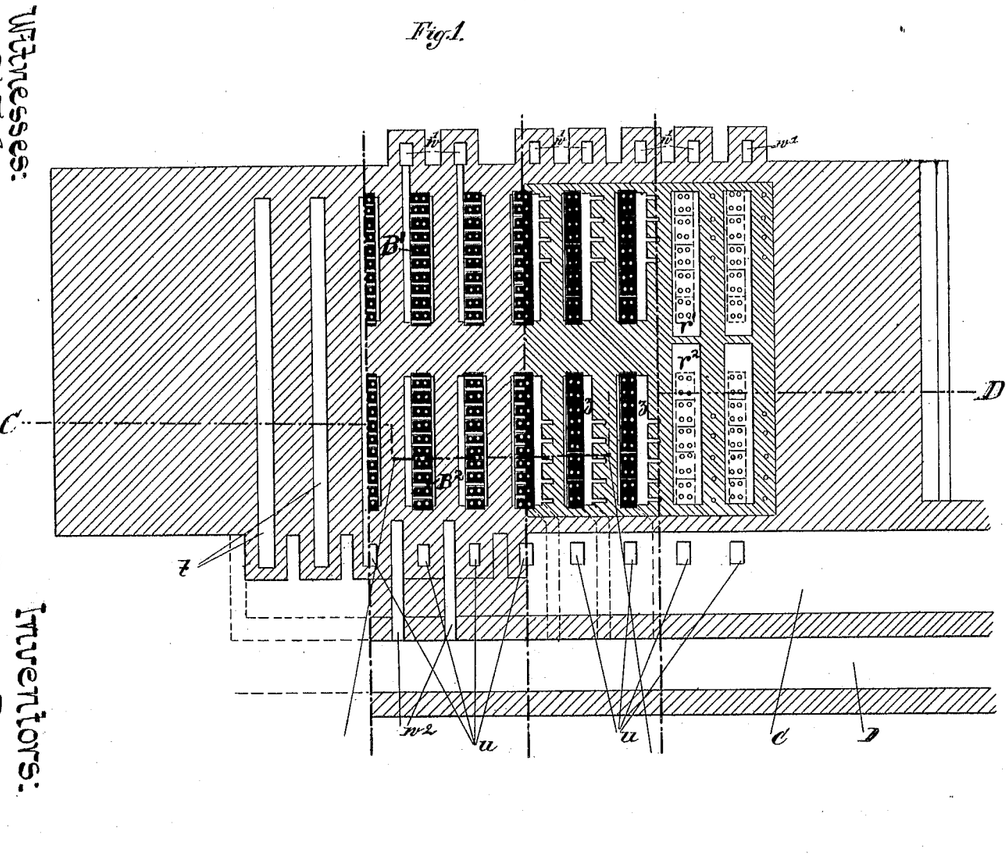
Figure 1 represents a horizontal section on the line A B, Fig. 2, of a series of horizontal coke ovens.

The ovens are put into operation as usual by first heating them until, together with their flues, they have become red hot, whereupon they are charged in the usual manner. If at the same time there are by-products to be extracted from the gases of the coke oven, the apertures $c\ c\ c$ are closed after the first few charges, by means of small chamotte plates placed for this purpose in the channels $d'\ d^2$ and pushed from the front part of the channels by means of a suitable tool, in front of the said apertures $c\ c$. The gases escape then through the iron pipe 1, 1, adapted to the aperture $a'$, and through the valve 2 into the collecting pipe 3 leading to the apparatus for separating the by products. The same blower causing the gases to pass through the latter, forces the non condensed back gases into the conduits $4', 4^2$, whence they flow through the branch-pipes 6, 6, into the channels $d'$ and $d^2$;—the cocks 5, 5, serving to regulate the gas current. The gases pass then from the said channels $d'$ and $d^2$ through the flues through which they passed before, the gases escaping directly from the apertures $c$.

We will now proceed to describe the vertical coke ovens. $A'\ A'\ A'$ are the chambers of the oven arranged in two rows between which is located the air heater $B^*$. To utilize directly the products of the dry distillation of the chambers $A'$ the products are directed through the apertures $a^3\ a^4$ at $b'$ into the flue $c'$, where they are ignited with the air which has been highly heated in the air heater $B^*$. As the flame is compelled to pass from the flue $c'$ through the two apertures $d^2\ d^4$ and then to descend, the part of the chamber located nearest to the outer wall of the oven receives the greatest effect of the flame, i. e. that part of the chamber which, being the most exposed to radiation requires the largest quantity of heat. The larger part of the flame will naturally pass through the apertures $d^2$ $d^4$ in the shortest way downward through the aperture $e$, since it is permitted to escape from the lateral aperture of the chamber only through the apertures $f^2 f^4$. It may sometimes happen that this takes place to a greater extent than is desired, although the flame may penetrate from the chamber $h'$ through the apertures $g$, also into the rear part of the flue $i$, arranged underneath. To force, if required, more of the flame through the apertures $g$, and to increase by this means the heating of the rear parts of the chamber, we make use of a slide or register $k$, for suitably straightening the passage $e'$ while the corresponding chamber is in operation. Through each of the apertures $f^2 f^4$ half of the flame of each pair of lateral flues passes into the flue $l$ on the back of the chamber and ascending in the latter it passes through the port $m'$ into the channel $n'$ or $n^2$ respectively above the air heater, and descending through the vertical pipes $o' o' o'$ gives off to the said air heater the larger part of its heat and goes then through the channels $p' q'$ and $p^2 q^2$ to the chimney $D'$ outside the oven. The air of combustion is conducted through the branch channels $s' s' s'$ from the channels $r^2 r^4$ open at the two ends (but which may also be closed, if required) to the lower part of the air heating column and flows then through the horizontal pipes $1^*$, $1^*$ and the intermediate spaces $1^2$, which are underneath the plates $2'$ and from thence subsequently through the horizontal pipes of the air heater arranged underneath the plates $2'$ $2^2$ $2^3$ and $2^4$, entering finally through the pipes arranged underneath the plate $2^4$ of the air heater, the passages $3' 3' 3'$ leading to the corresponding flues between the carbonizing chambers, or to the flues arranged on the ends of the said chambers.

Figure 10:
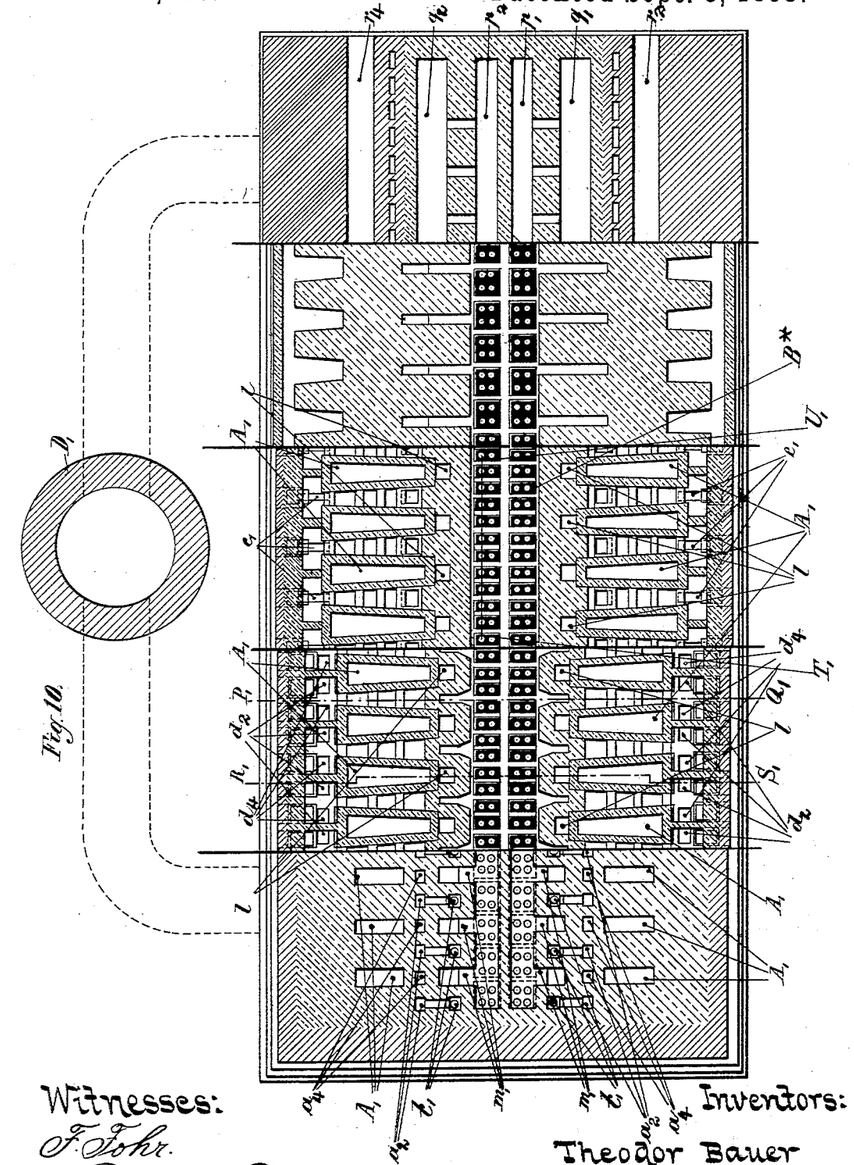
Fig. 10 represents sections on the lines A' B', C' D', E' F', G' H', and J' K', Fig. 12, of a series of vertical ovens.
Figure 11:
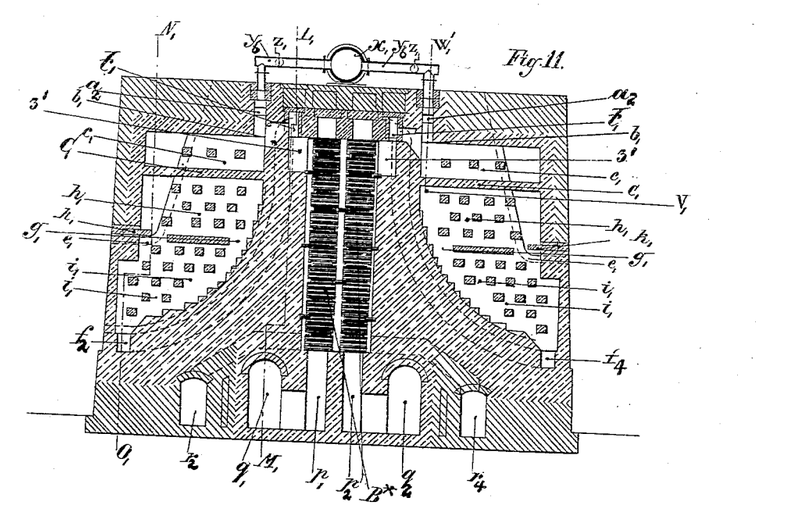
Fig. 11 is a section on the line P' Q' Fig. 10.
Figure 12:
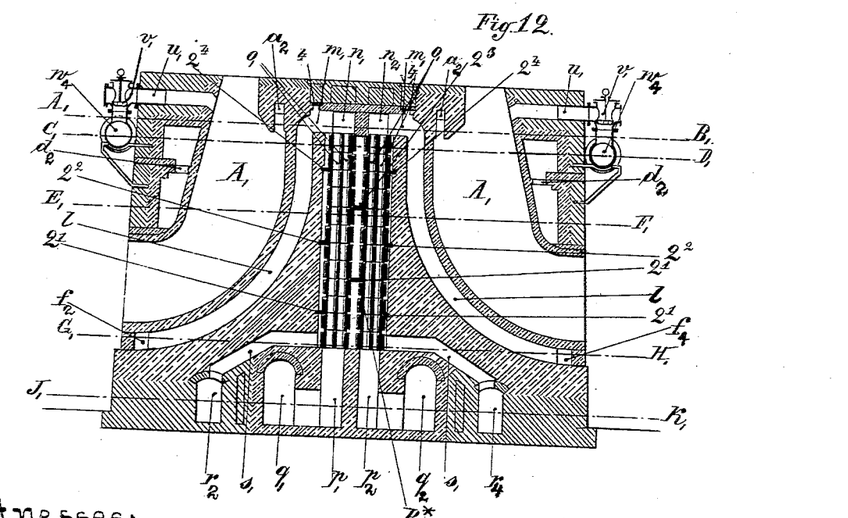
Fig. 12 is a section on the line R' S', Fig. 10.
Figure 13:
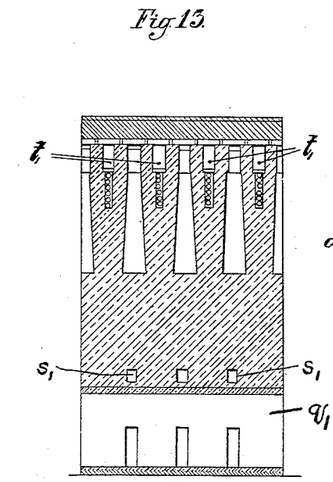
Fig. 13 is a section on the line L' M', Fig. 11.
Figure 14:
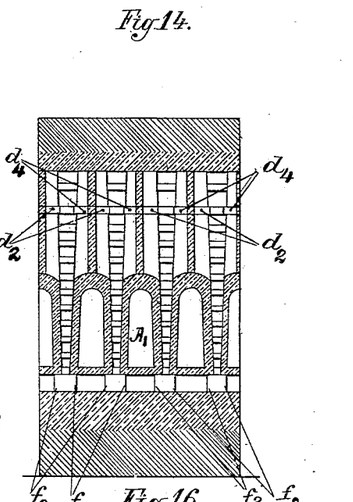
Fig. 14 is a section on the line N' O', Fig. 11.
Figure 15:
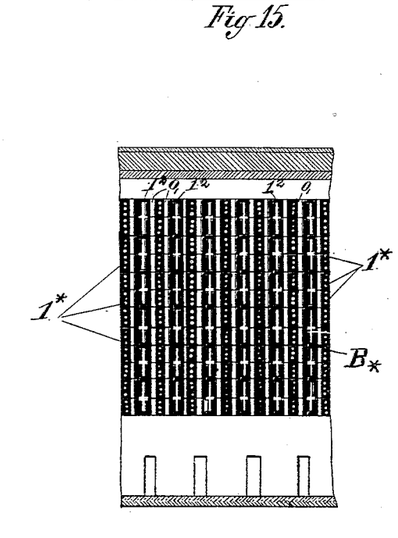
Fig. 15 is a section on the line T' U', Fig. 10.
Figure 16:
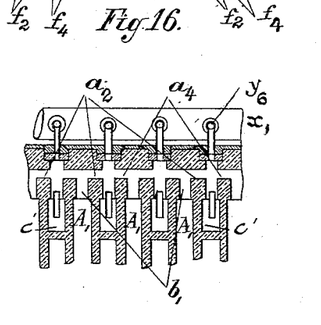
Fig. 16 is a section on the line V' W', Fig. 11.

In order to reduce, if required, the admission of the heated secondary air of combustion to certain flues, or to shut off the same entirely when repairs are to be made in certain chambers, a peculiarly shaped brick is arranged in each passage $3'$, the horizontal escape opening $t'$ of which is disposed in such a manner that by applying suitably-shaped small chamotte-plates the said opening $t'$ may be straightened at will or be entirely closed. Owing to the accessibility of the opening $t'$ from above, these manipulations may be effected at this place with a sufficient exactness while the oven is at work. Each passage $m'$ may be closed by inserting at 4 a slide or register and the corresponding chamber may be separated from its secondary chambers, and from the air heater by closing the passages at $f^2$ and $f^4$.

When by-products are to be extracted from the gases of the coke oven, the apertures $a^2$ $a^4$ which are easily accessible from above, as may be seen from the drawings, are closed by means of suitable bricks applied thereto, and the gases of the coke oven are drawn up through the condensing apertures into the conduits $w^4$ and $w^4$ in passing through the branch pipe $u$, and the valve $v$. The blower producing this effect then forces the gases into the conduit $x'$ whence they flow through the easily removable branch pipes $y^6 y^6$ (which flow may readily be regulated by the supply valves $z'$) into the same gas supply apertures through which the gases of the coke oven had entirely passed and at the place $b'$, where hitherto the ignition took place, the gases enter the corresponding flue.

What we claim as new, and desire to secure by Letters Patent, is—

1. The combination of a series of parallel carbonizing chambers, combustion chambers located near the tops of the carbonizing chambers and at the outer ends of the same, air heating apparatus, passages leading from the tops of the carbonizing chambers to the combustion chambers, passages leading downward from the combustion chambers near the outer ends of the carbonizing chambers, upward flues passing along the carbonizing chambers and flues placed in connection with said upward flues and conducting to the air heating apparatus; said air heating apparatus being provided with vertical downtakes for the waste gases connected at the bottom with the chimney, and also provided with air passages arranged to compel air and gas to travel in substantially opposite directions, inlets for atmospheric air connected to the bottoms of the air passages, and flues connecting the tops of the air passages with the combustion chambers, substantially as described.

2. The combination of a series of parallel carbonizing chambers, combustion chambers located near the tops of the carbonizing chambers and at the outer ends of the same, air heating apparatus, passages leading from the tops of the carbonizing chambers to the combustion chambers, passages leading downward from the combustion chambers near the outer ends of the carbonizing chambers, upward flues passing along the carbonizing chambers and flues placed in connection with said upward flues and conducting to the air heating apparatus; said air heating apparatus being provided with vertical downtakes for the waste gases connected at the bottom with the chimney, and also provided with air passages arranged to compel air and gas to travel in substantially opposite directions, inlets for atmospheric air connected to the bottoms of the air passages, flues connecting the tops of the air passages with the combustion chambers, and conduits as described for passing the gases from the carbonizing chambers to a condenser and for returning the same to the combustion chambers, substantially as described.

3. The combination of a series of carbonizing chambers $A^*$, combustion chambers $f^2$ located at both ends, on the sides, near the top of the carbonizing chambers, passages $c$ leading from top of chambers $A^*$ through channels $d'$ $d^2$ and apertures $e$ to combustion chambers $f'$ $f^2$, passages $i$ leading downward from the combustion chambers along the sides and near the ends of the carbonizing chambers, upward flues $n$, $n$ connected with the lower ends of said passages by apertures $k$ $k$ and channels $l'$ $l^2$; channels $o'$ $o^2$, flues $p$ and apertures $q^2$ $q^2$ leading to air heating chambers $r'$ $r^2$, the latter containing air heating apparatus $B'$ $B^2$ consisting of a series of fireclay tiles with vertical downtakes $s$ for the flame and with horizontal flues $x$ arranged to form zig zag flues for the air to be heated, channels $t$ leading to the chimney and air inlets $w'$ $w^2$ leading to the lower ends of the zig zag flues and channel $z$ and tubes $g$ leading from upper ends of zig zag flues $x$ to combustion chambers $f'$ $f^2$, substantially as shown and described.

4. The combination of a series of carbonizing chambers $A^*$, combustion chambers $f'$ $f^2$, passages $c$, channels $d'$ $d^2$ and apertures $e$, passages $i$, apertures $k$, channels $l'$ $l^2$ and upward flues $n$ $n$; channels $o'$ $o^2$, flues $p$ and apertures $q'$ $q^2$ leading to air heating chambers $r'$ $r^2$ containing air heating apparatus $B'$ $B^2$ with vertical downtakes $s$ for the flame connected at the lower ends with the chimney, and zig zag flues $x$ for the incoming air, which when heated passes to the combustion chambers $f'$ $f^2$ through tubes $g$, collecting pipes 3 connected with the inside of the chambers $A^*$ to carry the gas to a condenser, and conduits $4'$, $4^2$ for returning the gas to the combustion chambers $f'$, $f^2$, substantially as shown and described.

In testimony whereof we have signed our names to this specification in the presence of two subscribing witnesses.

THEODOR BAUER.
GEORG MENDHEIM.

Witnesses for Theodor Bauer:
W. HAGEMANN,
G. HÜLSMANN.
Witnesses for Georg Mendheim:
R. SOHERNY,
JOHANN RITZENSTEIGER.